Oct. 13, 1942.   E. G. KIMMICH ET AL   2,298,738
FLANGED HOSE
Original Filed Dec. 28, 1935
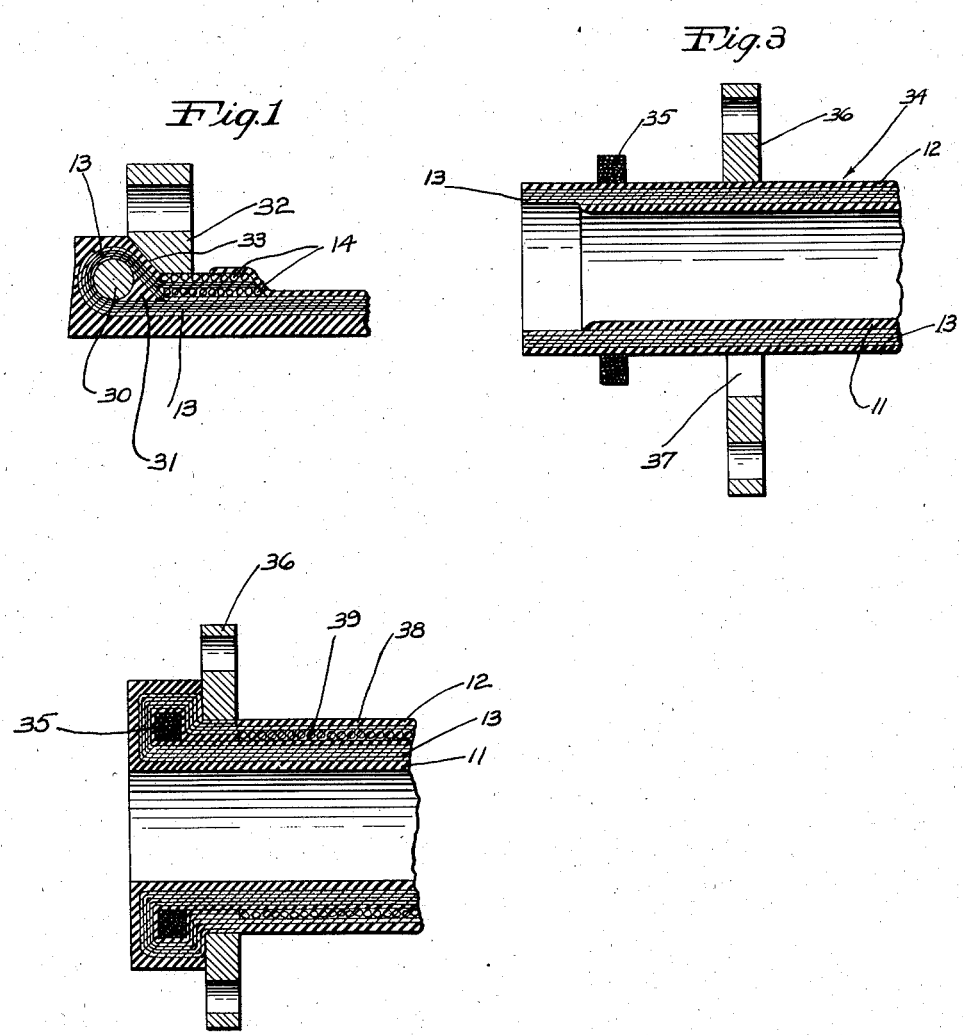
Inventor
Elmer G. Kimmich and
James L. Cutler
By
Attorney

UNITED STATES PATENT OFFICE 2,298,738

FLANGED HOSE

Elmer G. Kimmich and James L. Cutler, Akron, Ohio, assignors to Wingfoot Corporation, Wilmington, Del., a corporation of Delaware Original application December 28, 1935, Serial No. 56,554. Divided and this application February 2, 1939, Serial No. 254,211

3 Claims. (Cl. 285—71)

The present invention relates to flanged hose and it has particular relation to flexible rubber and fabric hose of the high-pressure type employed in connection with dredges, pumps, pipe lines and the like, or to hose reenforced by other means such as bead wire, etc.

This application is a division of my application Serial No. 56,554, filed December 28, 1935, now Patent No. 2,146,218 and specifically covers the forms of the invention shown in Figures 9, 10 and 11 of that application.

It has been observed in hose now on the market that the inner surfaces at the ends of the lengths or sections flare apart circumferentially when the sections are secured together. This results in an internal annular recess at the junction of the sections which permits sand or other abrasive material passing through the hose to impinge upon the inner edges of the ends of the sections and cause undue wear at this point. This flaring of the inner surfaces of the sections of hose was caused by the fact that when the flanges at the ends of two adjacent sections were drawn together between the clamping rings, the pressure was concentrated circumferentially in a zone located outside of the clamping bolts, thus causing the material of the hose located inside of these bolts to flow inwardly under the clamping pressure and to form the annular recess above referred to.

Another object of the invention is to provide a hose of the character described, the ends of which are formed with an excess quantity of material adjacent to the inner circumferential surface of the hose, so that when the sections are bolted together this excess material will bulge inwardly whereby when pressure develops in the hose the excess material forms a smooth uniform bore at the joint substantially that of the remainder of the hose as the material pulls away from the joint.

Another object of this invention is to provide a substantially sleeve-shaped clamping flange for the end of a hose section about which the material is wrapped and secured in place by coiled wire and the like.

Another object of this invention is to provide means in which a solid ring is embedded in the end of the hose within the outer surface thereof toward which the clamping ring is drawn during the connecting of the hose sections to firmly clamp the material of the hose therebetween.

Another object of this invention is to provide a hose having a ring comprising coils of bead wire embedded in the end of the hose and a clamping ring for clamping the material of the hose between the ring of bead wire and the clamping member.

With such objects in view, as well as other advantages which may be incident to the use of the improvements, the invention consists in the several parts and combinations thereof hereinafter set forth and claimed with the understanding that the several necessary elements constituting the same may be varied in proportions and arrangement without departing from the nature and scope of the invention as defined in the appended claims.

In order to make the invention more clearly understood there are shown in the accompanying drawings means for carrying the invention into practical effect, without limiting the improvements in their useful application to the particular constructions which, for the purpose of explanation, have been made the subject of illustration.

In the accompanying drawing:

Fig. 1 shows a device embodying our invention and employing a solid ring embedded in the end of a hose section;

Fig. 2 is a view similar to Fig. 1 showing a ring made up of bead wires embedded in the end of the hose section; and Fig. 3 illustrates the method of making a hose according to the form of the invention shown in Fig. 2.

In a high pressure hose the pressure tends to stretch the hose longitudinally and as the result there is a tendency for the joints of the hose to become separated, thus permitting escape of the fluid passing therethrough. In our parent application Serial No. 56,554, we have illustrated several forms of our invention, and the present application specifically relates to the employment of a metal ring in the end of a fabric hose to prevent collapse of the hose at the end and also to provide means against which a clamping member may abut to bring adjacent hose sections firmly into clamping engagement with each other. We have illustrated two forms of the invention, one in which a solid ring is employed, and the other in which a ring is formed by coiling bead wire into successive layers longitudinally and outwardly of the axis of the hose section, as will be more fully described hereinafter.

In Fig. 1 we have illustrated a hose section in which a rigid annular metal ring 30 is embedded in the end of the hose with the layers of fabric 13 brought up around the same and back along the end of the hose section where it is clamped by means of the coiled wire 14, the whole being enclosed within a layer of rubber similar to the other sections previously described. A filler 31 of rubber lies between the fabric just to the right of the ring 30. It is not necessary that this filler be used if the fabric is brought down closely around the ring 30, in which case the clamping flange 32, instead of having a tapered seat 33, as in Fig. 1, will preferably have a plain face. The clamping flange 32 is placed on the hose section before the enlarged end thereof is formed, as will be more apparent from the following description of Figs. 2 and 3.

Fig. 3 shows a step in the method of forming a modified form of the hose section shown in Fig. 1. A straight hose section is built up as illustrated at 34 in Fig. 3 and an annular ring formed of spaced parallel coils of bead wire indicated at 35 is slipped over the end of the hose after the clamping member 36 has been slipped over the same. The clamping member 36 has an opening 37 of greater diameter than the outside diameter of the hose 34. The ends of the fabric and rubber layers 11, 12 and 13 are then brought up and over the outside of the ring 35 and stitched down to the outside of the hose section to the right of that ring, after which the clamping ring 36 is moved into the position illustrated in Fig. 2. Additional layers of rubber 38 and wire 39 may then be bound around the hose to the right of the clamping member 36 and the whole vulcanized to produce the section shown in Fig. 2. When two similar hose sections are fastened together by drawing the clamping flanges 36 toward each other, the material is clamped firmly between the flanges and the rings 35. Instead of forming the ring 35 before placing it on the hose 34, the same may be formed on the hose section by merely wrapping the bead wire thereabout.

When a hose section such as shown in the drawing is clamped against the end of a similar hose section or against the end of any pipe or hose section, the material between the clamping ring and the ring embedded in the end of the hose is compressed as well as the material at the end face of the hose. The fabric making up the hose section is therefore firmly held in position and is kept from pulling around the embedded ring to thereby insure that after the hose section is clamped in position the clamping will not lose its effectiveness due to the material pulling away from the end face of the hose.

It is to be understood that, instead of or in conjunction with fabric reenforcement, bead wire arranged parallel to the hose length or peripherally thereof may be used and be made to conform to the functions and shapes given the fabric. Thus, strands of wire may be used in Figs. 1 or 2 to envelope the rings 30 or 35 respectively to prevent distortion of hose under high pressures.

From the foregoing it will be apparent that a very efficient joint between two sections of hose is effected, and one in which the tendency for an internal circumferential gap or recess to develop when the sections are secured together is materially reduced.

Other modifications and changes in proportion and arrangement of the several necessary elements constituting the invention may be made by those skilled in the art without departing from the nature and scope of the invention as defined in the appended claims.

Having thus described the invention, what we claim and desire to secure by Letters Patent of the United States is:

1. A flanged hose comprising a tubular body portion of rubberized fabric, a substantially non-contractible annular ring having a relatively square cross section and closely surrounding the tubular body adjacent the end thereof with the end of the body being cuffed back over the annular ring and against the body and vulcanized around the ring to form a radially directed flange having radially directed sides substantially parallel to the sides of the ring, and an inextensible metal clamping member surrounding the tubular body portion and having a radially directed side engaging the axially inner side of the flange.

2. The combination defined in claim 1 wherein further the annular ring having substantially a square cross section is made up of a plurality of closely adjacent convolutions of rubber-covered bead wire.

3. A flanged hose comprising a tubular body of rubberized fabric, a layer of rubber on the inner and outer surface of the tubular body, said inner rubber layer being removed adjacent the end of the hose to expose the rubberized fabric, an annular ring surrounding the tubular body adjacent the end of the hose with the end of the hose being cuffed back over the ring and molded to form a substantially radially directed flange, a clamping member surrounding the tubular body and engaging with the axially inner side of the flange having the rubberized fabric substantially exposed to contact, but the outer periphery of the flange and the axially outer side of the flange being covered and protected by a comparatively thick layer of rubber forming a cuffed back extension of the layer of rubber on the inner surface of the tubular body.

JAMES L. CUTLER.
ELMER G. KIMMICH.